(12) United States Patent
Albrecht et al.

(10) Patent No.: US 10,313,201 B2
(45) Date of Patent: Jun. 4, 2019

(54) MODULAR CONTROL DEVICE OF AN INDUSTRIAL AUTOMATION SYSTEM, AND METHOD FOR CONFIGURING THE MODULAR CONTROL DEVICE

(71) Applicant: Siemens Aktiengesellschaft, Munich (DE)

(72) Inventors: Harald Albrecht, Nuremberg (DE); Reiner Plonka, Fuerth (DE); Hartmut Stutz, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/759,064

(22) PCT Filed: Aug. 23, 2016

(86) PCT No.: PCT/EP2016/069861
§ 371 (c)(1),
(2) Date: Mar. 9, 2018

(87) PCT Pub. No.: WO2017/045872
PCT Pub. Date: Mar. 23, 2017

(65) Prior Publication Data
US 2019/0044817 A1 Feb. 7, 2019

(30) Foreign Application Priority Data

Sep. 14, 2015 (EP) .................................... 15185045

(51) Int. Cl.
*H04L 12/24* (2006.01)
*H04L 12/751* (2013.01)

(52) U.S. Cl.
CPC .......... *H04L 41/12* (2013.01); *H04L 41/0803* (2013.01); *H04L 45/02* (2013.01)

(58) Field of Classification Search
USPC ........................................................ 370/254
See application file for complete search history.

(56) References Cited

U.S. PATENT DOCUMENTS

2003/0236870 A1  12/2003  Boivie et al.
2004/0008694 A1  1/2004  Guo
(Continued)

FOREIGN PATENT DOCUMENTS

CN    104683233    6/2015
EP    1188293      3/2002
(Continued)

OTHER PUBLICATIONS

PCT International Search Report and Written Opinion of International Searching Authority dated Dec. 10, 2016 corresponding to PCT International Application No. PCT/EP2016/069861 filed Aug. 23, 2016.

(Continued)

*Primary Examiner* — Phong La
(74) *Attorney, Agent, or Firm* — Cozen O'Connor

(57) ABSTRACT

A method in which first routers have an extended router function for a connection to a superordinate communication network, wherein second routers include a restricted router function for a connection to a subordinate field level sub-network, where when further first routers are present, the router configuration units of the first routers each use priority values to check which first router has the highest priority value associated with it, where the first router having the highest priority value is configured as a superordinate router for a connection to a superordinate communication network so as to configure a modular control device of an industrial automation system that includes a central unit and at least one communication module that includes a respective integrated router, where router configuration units of the (Continued)

first routers detect available router functions and associated priority values of other routers.

13 Claims, 3 Drawing Sheets

(56) References Cited

U.S. PATENT DOCUMENTS

| | | | |
|---|---|---|---|
| 2004/0114591 A1 | 6/2004 | Naismith et al. | |
| 2006/0146821 A1 | 7/2006 | Singh et al. | |
| 2006/0215579 A1* | 9/2006 | Nadeau | H04L 12/4641 370/254 |
| 2007/0053300 A1* | 3/2007 | Zhu | H04L 45/12 370/238 |
| 2011/0205933 A1* | 8/2011 | Porat | H04L 41/0803 370/254 |
| 2012/0151233 A1 | 6/2012 | Chao | |
| 2012/0324044 A1* | 12/2012 | Aranda Gutierrez | H04L 45/04 709/217 |
| 2013/0058252 A1* | 3/2013 | Casado | H04L 12/4633 370/254 |
| 2016/0330168 A1* | 11/2016 | Albrecht | H04L 61/303 |
| 2017/0005907 A1* | 1/2017 | Onno | H04L 12/66 |

FOREIGN PATENT DOCUMENTS

| | | |
|---|---|---|
| EP | 2913727 | 9/2015 |
| JP | 2004-032758 | 1/2004 |
| JP | 2005-531199 | 10/2005 |
| JP | 2006-080983 | 3/2006 |
| JP | 2013-046252 | 3/2013 |
| JP | 2015-035678 | 2/2015 |
| RU | 2388044 C2 | 4/2010 |

OTHER PUBLICATIONS

Schneider Electric: "Modicon M580 The World First ePAC", XP055250496; Gefunden im Internet: URL:http://www.eic-automation.com/content/download/2588/15762/file/1.Modicon M580-Presentation pdf. 2014.

* cited by examiner

MODULAR CONTROL DEVICE OF AN INDUSTRIAL AUTOMATION SYSTEM, AND METHOD FOR CONFIGURING THE MODULAR CONTROL DEVICE

CROSS-REFERENCE TO RELATED APPLICATIONS

This is a U.S. national stage of application No. PCT/EP2016/069861 filed Aug. 23, 2016. Priority is claimed on EP Application No. 15185045 filed Sep. 14, 2015, the content of which is incorporated by herein by reference in its entirety.

BACKGROUND OF THE INVENTION

1. Field of the Invention

The present invention relates to industrial automation systems and, more particularly, to a modular control device of an industrial automation system and method for configuring the modular control device of the industrial automation system.

2. Description of the Related Art

Industrial automation systems serve to monitor and perform open-loop and closed-loop control of technical processes, in particular in the field of the automation of fabrication, of processes and of buildings, and permit control apparatuses, sensors, machines and industrial systems to operate in a way which is to be as autonomous and independent of human intervention as possible. Owing to the continuously increasing significance of information technology for automation systems that comprise numerous networked control units or computer units, methods for reliably making available functions that are distributed via an automation system are becoming ever more significant with respect to making monitoring functions and open-loop and closed-loop control functions available.

Interruptions of communication connections between computer units of an industrial automation system or automation devices can give rise to undesired or unnecessary repetition of a transmission of a service request. This gives rise to additional utilization of communication connections of the industrial automation system, which can lead to further system failures or faults. Furthermore, messages that are not transmitted or are transmitted incompletely can, for example, prevent an industrial automation system from transitioning to or remaining in a safe operating state. Finally, this can lead to failure of an entire production system, and costly production stoppage. A particular problematic situation in industrial automation systems often results from signaling traffic with messages that are comparatively numerous but relatively short, which exacerbates the above problems.

EP 1 188 293 B1 discloses an interface module for a stored-program controller that permits data requests to be transmitted to the stored-program controller via a communication device or a computer unit outside an industrial automation system, such as by Internet. The interface module comprises a processor with a real-time operating system, a communication network interface and backplane bus driver for a backplane bus system of the stored-program controller. Furthermore, a double protocol stack that comprises a first and second protocol stack, and a client control process, are implemented in the interface module. The client control process serves to communicate with the double protocol stack and the backplane bus driver and to initiate data requests. In addition, a server control process is provided to communicate with the double protocol stack and the backplane bus driver and respond to data requests. Furthermore, a protocol control process serves to communicate with the double protocol stack and the backplane bus driver and to retrieve and reply to requests that are directed to the protocol stack. While the first protocol stack is provided for messages that are uncritical in terms of timing, messages that are critical in terms of timing are handled by the second protocol stack.

US 2004/0114591 A1 describes a stored-program controller that comprises a backplane bus system and modules that are connected to the backplane bus system and that communicate via the backplane bus system via an internet communication protocol (IP). Each module has a separate IP address.

EP 2913727 A1 relates to a modular industrial automation device with a backplane bus system and a plurality of function modules that are connected to the backplane bus system and that each comprise a communication network adaptor, a function unit for implementing a communication protocol stack and a bridge element that is linked to the communication network adaptor. Furthermore, a router module that is connected to the backplane bus system is provided, which comprises a communication network adaptor, a function unit that is linked to the communication network adaptor and has the purpose of implementing a router communication protocol stack, and in each case a linking element for each function module. Such a linking element links the function unit for implementing the router communication protocol stack to the bridge element of the respective function module via the backplane bus system. Only the communication protocol stack of the router module comprises routing functions.

SUMMARY OF THE INVENTION

It is an object of the present invention to provide a method that permits a low-expenditure configuration of a modular control device which can be connected to a plurality of different subnetworks, and to provide a suitable control device.

These and other objects and advantages are achieved in accordance with the invention by a modular control device and a method for configuring the modular control device which comprises a central processor unit for processing control programs and at least one communication module, which each comprise an integrated router and are connected to one another via a backplane bus system. Here, first routers have an expanded router function for a connection to a superordinate communication network, while second routers have a restricted router function for a connection to a subordinate field-level subnetwork. Transmission of data via the backplane bus system is preferably performed in accordance with the internet protocol.

In accordance with the invention, router configuration units of the first routers detect router functions that are respectively available via router configuration units of other routers and assigned priority values of the respective routers. Furthermore, the router configuration units of the first routers respectively check whether other first routers are present, based on the detected router functions of other routers. Furthermore, when other first routers are present, the router configuration units of the first routers respectively check, based on the priority values, where the first router is assigned the highest priority value. The first router with the highest priority value is configured as the superordinate router for a connection to a superordinate communication network. All the other routers are respectively configured as subordinate routers for a connection to a subordinate field-level subnetwork and assume a name service and subnetwork address configuration that is predefined by the superordinate router. In this way, an automatic connection of a modular control device to a multiplicity of subordinate field-level subnetworks and to a superordinate communication network can be ensured even without a previous projection.

In accordance with an advantageous embodiment of the method in accordance with the invention, the router of the central processor unit is configured as the superordinate router if no first routers are present. Here, the router of the central processor unit can, for example, assume a name service and subnetwork address configuration that is predefined via a projection system, with the result that a defined configuration is always ensured.

Furthermore, in accordance with another advantageous embodiment of the present invention the superordinate router can assume, via its router configuration unit, a name service and subnetwork address configuration from the superordinate communication network. The subordinate routers preferably assume, via their respective router configuration unit, the name service and subnetwork address configuration of the superordinate router. This ensures that all the integrated routers of the modular control device are configured in a way that is consistent with one another.

In accordance with a preferred embodiment of the method in accordance with the invention, when a communication module is removed during ongoing operation without replacement, configurations of remaining routers are retained unchanged. Advantageously, during ongoing operation, the router configuration unit that is assigned to the central processor unit checks, only when a communication module is added, which router is to be configured as a superordinate router. Accordingly, the router configuration unit that is assigned to the central processor unit brings about, only when there is a change in the superordinate router, a reconfiguration of routers whose configuration is respectively dependent on the change in the superordinate router. In this way, the configuration of the modular control device can be kept as stable as possible during ongoing operation. Particularly in this way, a replacement of communication modules that is not yet entirely concluded does not give rise to an inconsistent or unstable system configuration. Furthermore, in this context there can be provision that during a control program sequence the router configuration unit that is assigned to the central processor unit is blocked against configuration changes. Here, during a control program sequence the router configuration unit that is assigned to the central processor unit is preferably blocked against configuration changes even when a communication module is added.

In accordance with a further embodiment of the present invention, when other first routers are present the router configuration units of the first routers check whether a projection of a superordinate router, which projection has priority over the priority values of the respective first routers is stored in the central processor unit. According to the projection which is stored in the central processor unit, when there is a positive checking result, the first router is advantageously configured as the superordinate router in accordance with the projection stored in the central processor unit. A desired router topology can therefore also be predefined via a projected configuration. It is also an object of the invention to provide a modular control device for implementing the method in accordance with the disclosed embodiments that comprises a central processor unit for processing control programs and at least one communication module, which each comprise an integrated router and are connected to one another via a backplane bus system. Here, first routers have an expanded router function for a connection to a superordinate communication network, while second routers have a restricted router function for a connection to a subordinate field-level subnetwork. Router configuration units of the first routers are configured to detect router functions that are respectively available via router configuration units of other routers and assigned priority values of the respective routers. In addition, the router configuration units of the first routers are configured to respectively check whether other first routers are present, based on the detected router functions of other routers.

In accordance with disclosed embodiments of the invention, when other first routers are present, the router configuration units of the first routers are configured to respectively check, based on the priority values, which first router is assigned the highest priority value. Furthermore, the routers are configured such that the first router with the highest priority value is configured as the superordinate router for a connection to a superordinate communication network. In addition, the routers are configured such that all the other routers are respectively configured as subordinate routers for a connection to a subordinate field-level subnetwork and assume a name service and subnetwork address configuration that is predefined by the superordinate router.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be explained in more detail below using an exemplary embodiment and with reference to the drawing, in which.

DETAILED DESCRIPTION OF THE EXEMPLARY EMBODIMENTS

Figure 1:
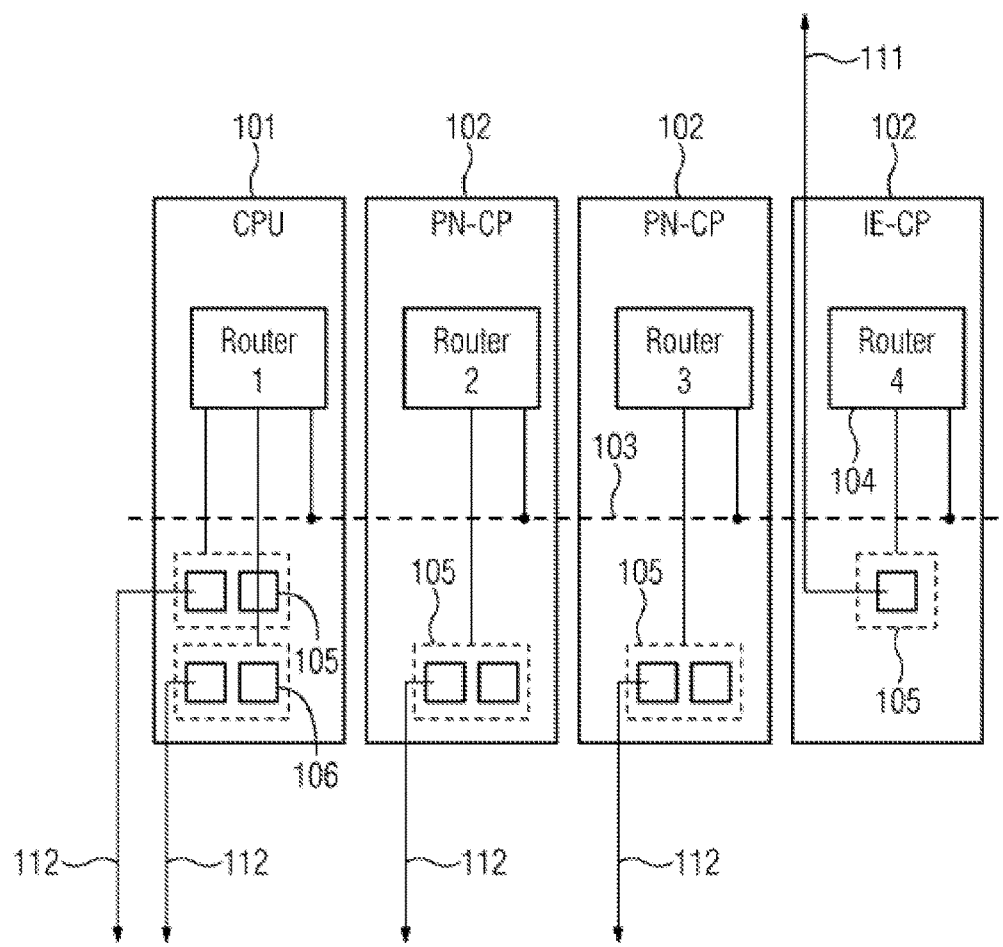
FIG. 1 shows a schematic illustration of a modular control device of an industrial automation system with a plurality of communication modules and integrated routers which are connected to a backplane bus system in accordance with the invention.

The modular control device illustrated in FIG. 1 has a control central processor unit 101 and a plurality of communication processors 102 that are connected to one another via an IPv6-based backplane bus 103. In the present exemplary embodiment, the modular control device is a stored-program controller.

Both the control central processor unit 101 and the communication processors 102 respectively comprise at least one Ethernet interface 105 or field bus interface 106 for uplink connection of the modular control device to a system network 111 or for the downlink connection to field bus subnetworks 112. The Ethernet interfaces 105 can be used not only for the uplink connection but also for the downlink connection to PROFINET-based field bus subnetworks. Furthermore, the control central processor unit 101 and the communication processors 102 respectively comprise an integrated router 104 that implements, in particular, an IP communication protocol stack and accesses Ethernet interfaces 105 or field bus interfaces 106 via interface drivers as hardware abstraction elements.

In modular control devices up to now it has been necessary, before activation occurs, to project which interface is provided for the uplink connection and which interfaces are used for the downlink connection. Since the backplane bus 103 of the modular control device permits a design of a stand-alone IPv6 link with multicast properties and since it can be treated as an Ethernet link by IPv6 stacks, available functions can also be used on the backplane bus 103. This includes, in particular, autonomous decentralized generation of IPv6 addresses.

In order to organize the routers 104, integrated into the control central processor unit 101 and into the communication processors 102, within a hierarchy, each router 104 is assigned either a role as an uplink router or a role as a downlink router. Usually only one router is provided as an uplink router per modular control device. In special cases, a plurality of routers can simultaneously perform the role as an uplink router. In this context, relevant rules apply for multi-homed networks with automatic connection.

The uplink router constitutes a default router for the downlink routers for the backplane bus 103. In this context, an interface of the uplink router is defined as an uplink interface. All the other interfaces of the uplink router are treated as downlink interfaces. The downlink routers use the uplink router as their default router. With the exception of internal interfaces of the downlink routers to the backplane bus 103, all the interfaces of the downlink routers are treated as downlink interfaces. An IPv6 router assumes subnetwork prefixes and its DNS configuration, i.e., DNS server addresses and DNS search list via the uplink interface. The subnetwork prefixes can be assumed, for example, within the scope of a hierarchic or a centralized prefix delegation. The DNS configuration of the routers is passed on via the subnetworks, in particular PROFINET-based field bus subnetworks, which are subordinate to respective downlink interfaces.

Figure 2:
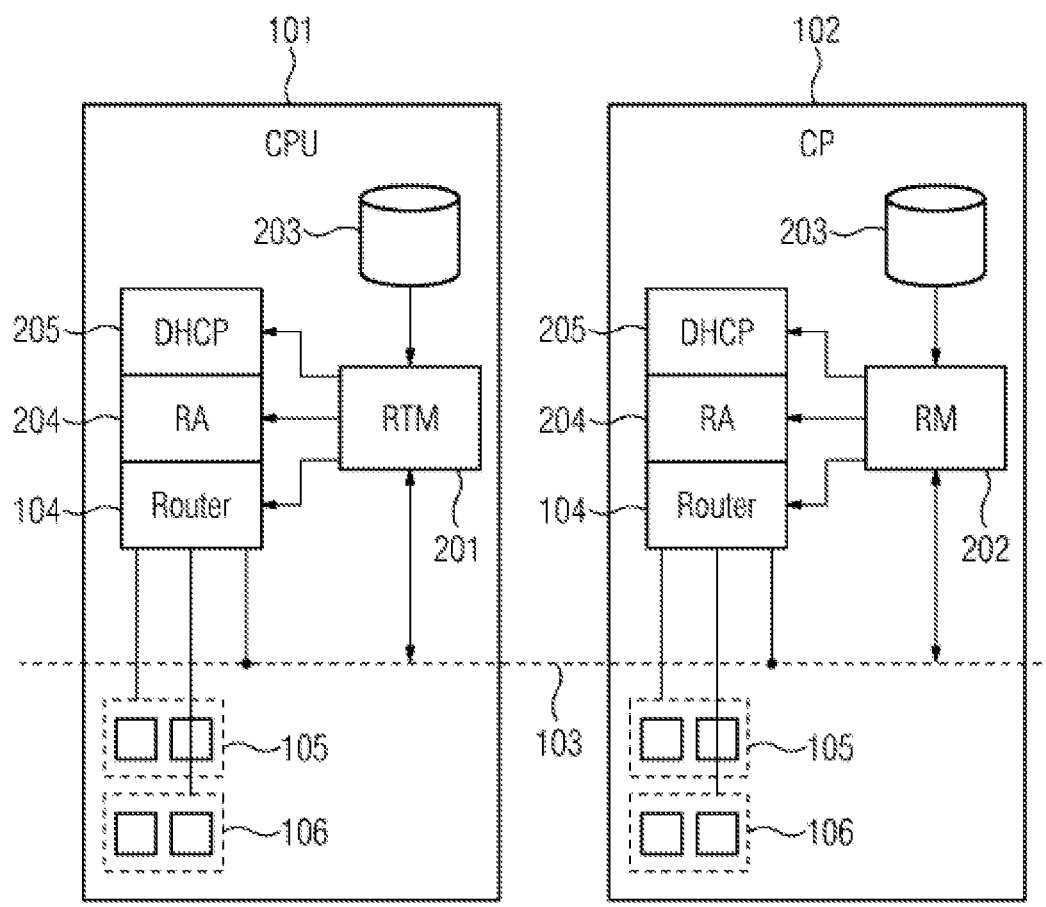
FIG. 2 shows the modular control device of FIG. 1, where the integrated routers are each assigned a router manager component or router topology manager component.

In order to define a topological link of the integrated routers 104 within the modular control device, the control central processor unit 101 comprises, according to FIG. 2, a router topology manager component 201. In an analogous way, the communication processors 103 each have a corresponding router manager component 202. The router topology manager component 201 is provided for coordinating the topological linking of the integrated routers 104 within the modular control device. The router topology manager component 201 interrogates, via the backplane bus 103, information that is relevant for coordination via the respective router manager component 202 per communication processor 102, in particular interrogates basically possible router roles. The information about possible router roles is respectively stored, with a priority value assigned to the respective router 104, in a database 203 that is assigned to the router topology manager component 201 or the respective router manager component 202. In the present exemplary embodiment, general statements below apply to information that is stored in the respective database 203.

1. For a control central processor unit with an uplink capability, "uplink possible" as a role attribute and the priority value 0 are stored in the respective database 203.
2. For a PROFINET communication processor for connecting field bus subnetworks, "only downlink" as a role attribute and the priority value 0 are stored in the respective database 203.
3. For an Ethernet communication processor for connecting to a system network, "uplink possible" as a role attribute and the priority value 10 are assigned in the respective database 203.

The router topology manager component 201 performs, based on the interrogated information, an evaluation to define specific router roles for the routers 104 of the control central processor unit 101 and of the communication processors 102. These defined router roles are then used to configure the integrated routers 104, in particular with respect to router function components such as Router Advertisement (RA) relay 204 and Dynamic Host Configuration Protocol (DHCPv6) relay 205. In the present exemplary embodiment, the general principles below apply to the evaluation of the interrogated information by the router topology manager component 201.

1. For a router with role attribute "only downlink", a role as a downlink router is always configured. The evaluation is thus completed.
2. When there are a plurality of routers with the role attribute "uplink possible", the router with the highest priority value is configured as the uplink router; and
3. all the other routers with the role attribute "uplink possible" are configured as downlink routers.

After the conclusion of the evaluation, the router topology manager component 201 of the control central processing unit 101 transmits, via the backplane bus 103, information to the router manager components 202 of the communication processors 102, as to which router role is to be respectively configured. The router manager components 202 then configure their assigned routers 104 correspondingly. In an analogous manner, this also applies to the router role, configured by the router topology manager component 201, of the router 104 that is integrated into the control central processor unit 101.

If communication processors are exchanged during ongoing operation (hot plugging) it is to be ensured that configured router roles do not change autonomously or in an uncoordinated manner. Instead, topological links of the integrated routers 104 within the modular control device are to be retained for the time being. Therefore, when a communication processor is added, only one corresponding event message is transmitted to the router topology manager component 201 of the control central processor unit 101. The router topology manager component 201 only performs a re-evaluation of router roles that are to be defined in response to this event message. Only if a router role changes due to this re-evaluation does the router topology manager component 201 bring about a reconfiguration of the respective router 104. In particular, when communication processors 102 are removed from the modular control device, configuration information is not immediately deleted but is instead initially retained. This prevents communication processors that have not yet been replaced from dropping out of the above evaluation in the case of overlapping removal/addition processes.

Furthermore, the router topology manager component 201 of the control central processor unit 101 can be locked as soon as a control program runs in the modular control device, in order to ensure a program sequence based on stable topological links of the integrated routers 104 within the modular control device. Here, the re-evaluation of router roles that are to be defined does not occur even in the case of addition events.

Basically, a desired router topology can be predefined by an overall configuration that is produced via a projection system or engineering system. Here, router roles are projected during a planning phase via an engineering system and are stored as an overall configuration in the database 203 of the control central processor unit 101. The projected router roles are then transmitted by the router topology manager component 201 of the control central processor unit 101 via the backplane bus 103 to the router manager components 203 of the communication processors 102 for further processing.

Figure 3:
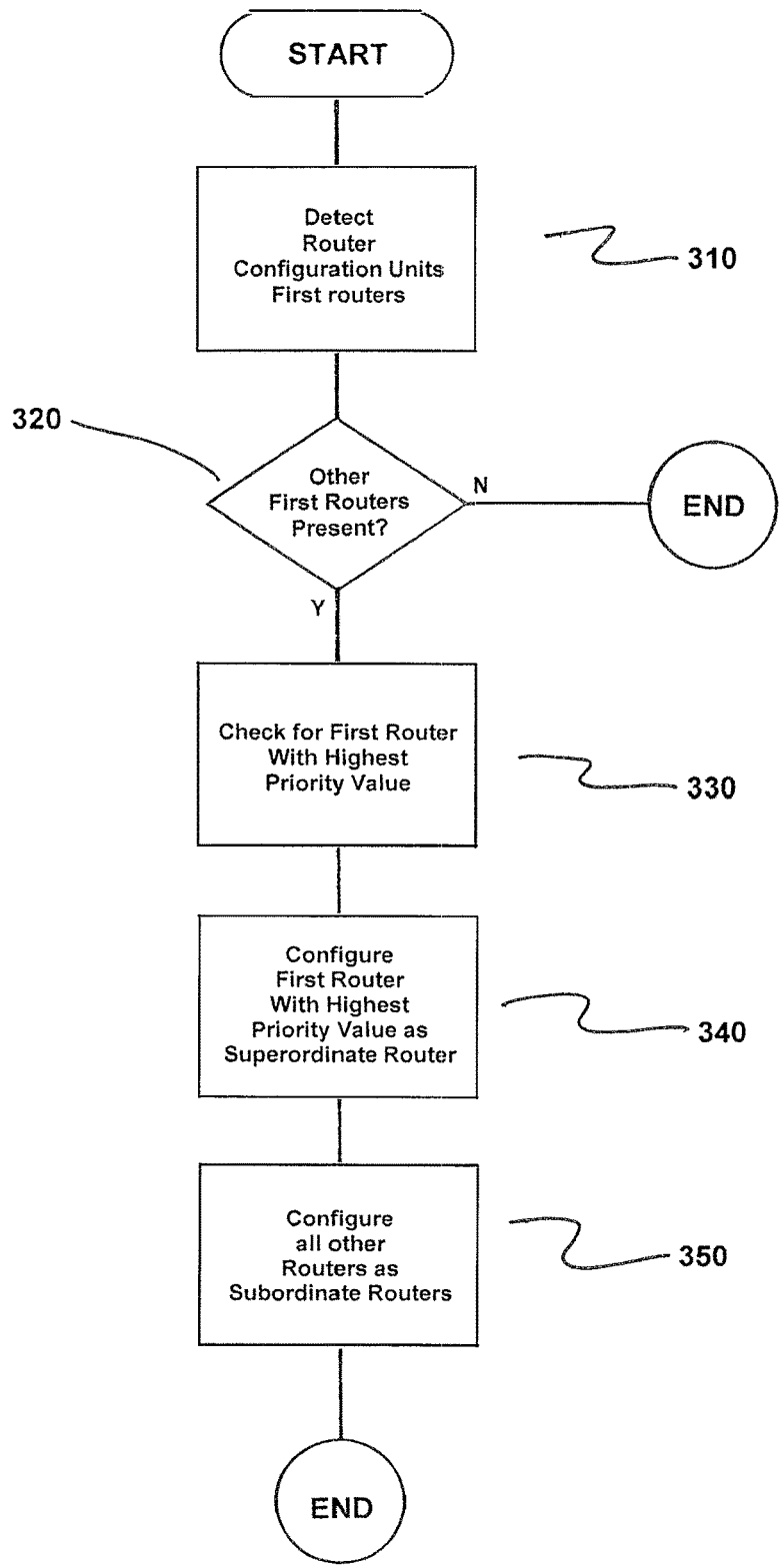
FIG. 3 is a flowchart of the method in accordance with the invention.

FIG. 3 is a flowchart of the method for configuring a modular control device of an industrial automation system. In accordance with the invention, the modular control device comprises a central processor unit for processing control programs and at least one communication module, which each comprise an integrated router and are interconnected via a backplane bus system, as well as first routers having an expanded router function for a connection to a superordinate communication network, and second routers having a restricted router function for a connection to a subordinate field-level subnetwork.

The method comprises detecting, router configuration units of the first routers, router functions which are respectively available via router configuration units of other routers and assigned priority bands of the respective routers, as indicated in step 310.

Next, whether other first routers are present is checked by respective router configuration units of the first routers, based on detected router functions of other routers, as indicated in step 320.

Next, which first router is assigned a highest priority value is checked by the respective router configuration units of the first routers is checked, based on the priority values, when other first routers are present, as indicated in step 330.

Next, the first router with the highest priority value is configured as the superordinate router for a connection to a superordinate communication network, as indicated in step 340.

Next, all other respective routers are configured as subordinate routers for a connection to a subordinate field-level subnetwork and assuming a name service and subnetwork address configuration which is predefined by the superordinate router is assumed, as indicated in step 350.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those that structures and/or elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for configuring a modular control device of an industrial automation system, the modular control device comprising a central processor unit for processing control programs and at least one communication module, which each comprise an integrated router and are interconnected via a backplane bus system, and first routers having an expanded router function for a connection to a superordinate communication network, and second routers having a restricted router function for a connection to a subordinate field-level subnetwork, the method comprising:

detecting, router configuration units of the first routers, router functions which are respectively available via router configuration units of other routers and assigned priority bands of respective routers;

checking, by respective router configuration units of the first routers, whether other first routers are present, based on detected router functions of other routers;

checking, when the other first routers are present, by the respective router configuration units of the first routers check, based on priority values, which first router is assigned a highest priority value;

configuring the first router with the highest priority value as a superordinate router for the connection to the superordinate communication network; and configuring all other respective routers as subordinate routers for the connection to the subordinate field-level subnetwork and assuming a name service and subnetwork address configuration which is predefined by the superordinate router.

2. The method as claimed in claim 1, wherein the integrated router of the central processor unit is configured as the superordinate router if no first routers are present.

3. The method as claimed in claim 2, wherein the integrated router of the central processor unit assumes a name service and subnetwork address configuration which is predefined via a projection system.

4. The method as claimed in claim 1, wherein the superordinate router assumes, via the router configuration unit, a name service and subnetwork address configuration from the superordinate communication network.

5. The method as claimed in claim 1, wherein the subordinate routers assume, via the respective router configuration units, the name service and subnetwork address configuration of the superordinate router.

6. The method as claimed in claim 1, wherein configurations of remaining routers are retained unchanged when a communication module is removed during ongoing operation without replacement.

7. The method as claimed in claim 6, wherein, during ongoing operation, the router configuration unit which is assigned to the central processor unit checks, only when a communication module is added, which router is to be configured as a superordinate router; wherein the router configuration unit which is assigned to the central processor unit brings about, only when a change in the superordinate router occurs, a reconfiguration of a router whose configuration is dependent on the change in the superordinate router.

8. The method as claimed in claim 1, wherein during a control program sequence the router configuration unit which is assigned to the central processor unit is blocked against configuration changes during a control program sequence.

9. The method as claimed in claim 8, wherein the router configuration unit which is assigned to the central processor unit is blocked against configuration changes during a control program sequence even when a communication module is added.

10. The method as claimed in claim 1, wherein the router configuration units of the first routers check whether a projection of a superordinate router, which projection has priority over the priority values of the respective first routers, is stored in the central processor unit when other first routers are present.

11. The method as claimed in claim 10, wherein the first router is configured as the superordinate router in accordance with the projection stored in the central processor unit when a positive checking result occurs.

12. The method as claimed in claim 1, wherein transmission of data via the backplane bus system is performed in accordance with the internet protocol.

13. A modular control device of an industrial automation system, comprising:
- a central processor unit for processing control programs; and
- at least one communication module, the central processor unit and the at least one communication module each comprising an integrated router and being interconnected to one another via a backplane bus system, first routers having an expanded router function for a connection to a superordinate communication network, and second routers having a restricted router function for a connection to a subordinate field-level subnetwork;
- wherein router configuration units of the first routers are configured to detect router functions which are respectively available via router configuration units of other routers and assigned priority values of respective routers;
- wherein the router configuration units of the first routers are configured to respectively check whether other first routers are present, based on detected router functions of other routers;
- wherein the router configuration units of the first routers are configured to respectively check, based on priority values, which first router is assigned a highest priority value when the other first routers are present;
- wherein the routers are configured such that the first router with the highest priority value is configured as a superordinate router for the connection to the superordinate communication network, and such that all other routers are respectively configured as subordinate routers for the connection to the subordinate field-level subnetwork and assume a name service and subnetwork address configuration which is predefined by the superordinate router.

* * * * *